$$\text{US011354819B2}$$

United States Patent
Nathan et al.

(10) Patent No.: US 11,354,819 B2
(45) Date of Patent: Jun. 7, 2022

(54) METHODS FOR CONTEXT-AWARE OBJECT TRACKING

(71) Applicant: Nortek Security & Control, Carlsbad, CA (US)

(72) Inventors: Vaidhi Nathan, San Jose, CA (US); Maxim Sokolov, Nizhny Novgorod (RU); Chandan Gope, Derwood, CA (US)

(73) Assignee: Nortek Security & Control, Carlsbad, CA (US)

( * ) Notice: Subject to any disclaimer, the term of this patent is extended or adjusted under 35 U.S.C. 154(b) by 132 days.

(21) Appl. No.: 16/570,887

(22) Filed: Sep. 13, 2019

(65) Prior Publication Data

US 2020/0111231 A1 Apr. 9, 2020

Related U.S. Application Data

(63) Continuation-in-part of application No. 15/179,972, filed on Jun. 11, 2016, now Pat. No. 10,445,885.

(60) Provisional application No. 62/235,576, filed on Oct. 1, 2015.

(51) Int. Cl.
  *G06T 7/73* (2017.01)
  *G06K 9/00* (2022.01)
  *H04N 7/18* (2006.01)

(52) U.S. Cl.
  CPC ............ *G06T 7/75* (2017.01); *G06K 9/00771* (2013.01); *H04N 7/18* (2013.01); *G06T 2207/10016* (2013.01)

(58) Field of Classification Search
  None
  See application file for complete search history.

(56) References Cited

U.S. PATENT DOCUMENTS

| | | | |
|---|---|---|---|
| 8,134,596 B2 | 3/2012 | Lei et al. | |
| 9,183,466 B2 | 11/2015 | Siskind et al. | |
| 9,361,520 B2 * | 6/2016 | Collins | G06K 9/00724 |
| 9,396,412 B2 * | 7/2016 | Kuo | G06K 9/4652 |
| 9,454,537 B2 | 9/2016 | Prahlad et al. | |
| 2007/0003141 A1 * | 1/2007 | Rittscher | G06K 9/00778 382/181 |
| 2008/0166045 A1 * | 7/2008 | Xu | G06T 7/251 382/170 |

FOREIGN PATENT DOCUMENTS

| | | |
|---|---|---|
| EP | 1859410 | 10/2010 |
| EP | 1859411 | 11/2010 |

* cited by examiner

*Primary Examiner* — Nikkram Bali
(74) *Attorney, Agent, or Firm* — Patent Ventures, LLC

(57) ABSTRACT

The primary purpose of the present invention is to enable devices/machines/systems to perform an optimized video analytics on images and videos. The present invention focuses on detecting, tracking, and classifying objects in a scene. Here, the tracking is performed by comparing objects across at least two frames and then associating the objects based on a cost matrix. Some examples of the objects include, but are not limited to, persons, animals, vehicles, or any other articles or items.

10 Claims, 7 Drawing Sheets

Exemplary Environment

METHODS FOR CONTEXT-AWARE OBJECT TRACKING

TECHNICAL FIELD

The present invention generally relates to the field of object tracking, and in particular, the present invention relates to methods and systems for tracking objects in videos and/or images using a cost matrix.

BACKGROUND

With the advent of security and surveillance systems, the need to accurately track objects in images and videos has increased multi-fold. Be it home security or any other premise monitoring (such as public areas, roads, official buildings, schools, or any other establishments), it is imperative to perform optimized and precise video analytics (such as detecting and tracking objects). An object-to-be-tracked could range from a person, vehicle, animal, building, an article to any other similar object. Further, since video analytics help extract meaningful insights from images or video grabs, it also finds utility in other domains such as a retail system, a monitoring system, a business intelligence-based system, and the like. For example, in a retail system, video analytics tools are used to track customers or carts inside a retail store/mall, or to monitor customer wait times. Similarly, for business-intelligence based systems, video analytics is used to measure traffic patterns and open/close business performance at multiple commercial locations.

The existing video analytics solutions perform object tracking based on at least one of a MeanShift technique, an Optical Flow technique, and more recently online learning based strategies. In online learning based strategies, the common theme is to continuously learn and update a discriminative classifier model, such as Support Vector Machine (SVM), which attempts to learn the separation of the object from its surroundings. Given this model at a time interval t−1, location of an object at time interval t can be predicted. However, a major shortcoming of such solutions is their computational complexity, because of which these are not suitable to be implemented on embedded platforms. Therefore, there is a need for an accurate and computationally efficient solution for solving the problem of object tracking in videos/images.

SUMMARY

An embodiment of the present invention discloses an object tracking system for tracking objects across a first frame and a second frame of a video. The object tracking system comprises of a processor, a non-transitory storage element coupled to the processor and encoded instructions stored in the non-transitory storage element. The encoded instructions when implemented by the processor, configure the object tracking system to detect one or more objects in the first frame of the video, and one or more candidate objects in the second frame of the video. Further, the object tracking system is configured to compute a cost function between each object of the one or more objects, and each candidate object of the one or more candidate objects using a mapping unit. This cost function is computed based on a visual dissimilarity between the object and the candidate object, a physical distance between the object and the candidate object, and a difference between an expected location of the object in the second frame and the candidate object.

Using a memory unit, the object tracking system is configured to store values corresponding to cost functions computed by the mapping unit, wherein the values are stored in a two-dimensional array. In addition, the object tracking system is configured to select one or more pairs of objects based on a pre-determined criteria using a tracking unit, wherein each pair of objects comprises of an object of the one or more objects and a candidate object of the one or more candidate objects, wherein the pre-determined criteria is based on the values stored in the two-dimensional array. The tracking unit is configured to associate the object with the candidate object, wherein the object and the candidate object belong to a pair of the one or more pairs of objects, whereby the candidate object is the location of the object in the second frame of the video.

An embodiment of the present invention discloses a method for tracking objects across a first frame and a second frame of a video. The method comprises detecting one or more objects in the first frame of the video, detecting one or more candidate objects in the second frame of the video, and computing a cost function between each object of the one or more objects and each candidate object of the one or more candidate objects. This computation of the cost function is based on a visual dissimilarity between the object and the candidate object, a physical distance between the object and the candidate object, and a difference between an expected location of the object in the second frame and the candidate object. The method further comprises storing values corresponding to cost functions, wherein the values are stored in a two-dimensional array in a memory unit. Furthermore, the method comprises selecting one or more pairs of objects based on a pre-determined criteria, wherein each pair of objects comprises of an object of the one or more objects and a candidate object of the one or more candidate objects, and wherein the pre-determined criteria is based on the values stored in the two-dimensional array. The object is associated with the candidate object, wherein the object and the candidate object belong to at least one of the one or more pairs of objects, whereby the candidate object is the location of the object in the second frame of the video.

An additional embodiment of the present invention discloses a computer programmable product for tracking objects across a first frame and a second frame of a video. The computer programmable product includes a set of programming instructions, which when executed by a processor, causes the processor to detect one or more objects in the first frame of the video, detect one or more candidate objects in the second frame of the video, and compute a cost function between each object of the one or more objects and each candidate object of the one or more candidate objects. This computation of the cost function is based on a visual dissimilarity between the object and the candidate object, a physical distance between the object and the candidate object, and a difference between an expected location of the object in the second frame and the candidate object. The processor stores values corresponding to cost functions, wherein the values are stored in a two-dimensional array in a memory unit. Furthermore, the processor selects one or more pairs of objects based on a pre-determined criteria, wherein each pair of objects comprises of an object of the one or more objects and a candidate object of the one or more candidate objects, and wherein the pre-determined criteria is based on the values stored in the two-dimensional array. The object is associated with the candidate object, wherein the object and the candidate object belong to at least one of the one or more pairs of objects, whereby the candidate object is the location of the object in the second frame of the video.

DETAILED DESCRIPTION OF DRAWINGS

The present invention will now be described more fully with reference to the accompanying drawings, in which embodiments of the present invention are shown. However, this invention should not be construed as limited to the embodiments set forth herein. Rather, these embodiments are provided so that this invention will be thorough and complete, and will fully convey the scope of the present invention to those skilled in the art. Like numbers refer to like elements throughout.

Overview:

The primary purpose of the present invention is to enable devices/machines/systems to perform an optimized video analytics on images and videos. The present invention focuses on detecting, tracking, and classifying objects in a scene. Here, the tracking is performed by comparing objects across at least two frames and then associating the objects based on a cost matrix. Some examples of the objects include, but are not limited to, persons, animals, vehicles, or any other articles or items. However, for a person skilled in the art it understood these examples are just for understanding purposes and the present invention can be implemented for any types of objects.

Figure 1:
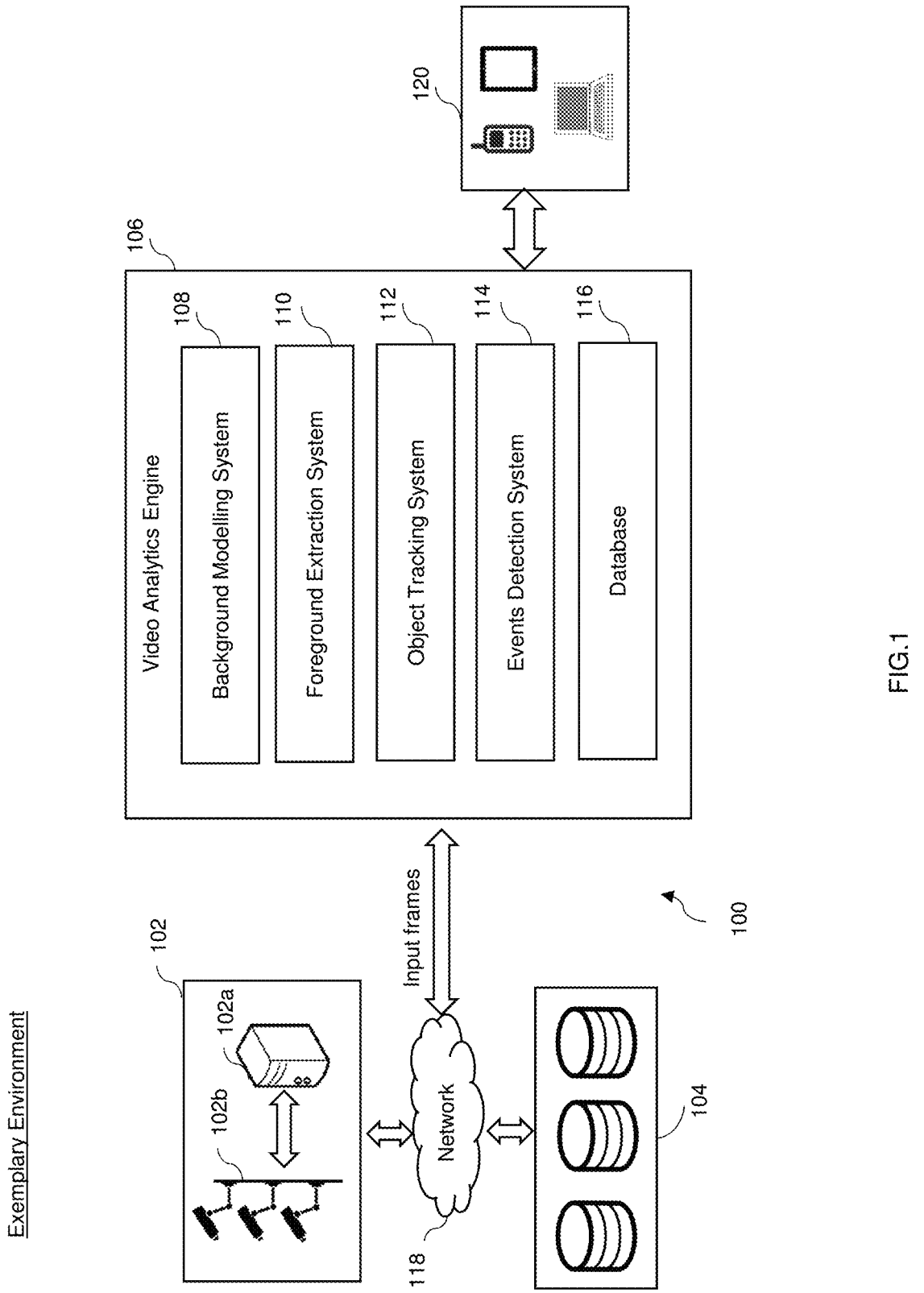
FIG. 1 illustrates an exemplary environment in which various embodiments of the present invention can be practiced.

Exemplary Environment:

FIG. 1 illustrates an exemplary environment 100 in which various embodiments of the present invention can be practiced. The environment 100 includes a real-time streaming system 102, a video/image archive 104, and a video analytics engine 106. The real-time streaming system 102 includes a video server 102a, and a plurality of video/image capturing devices 102b installed across multiple locations. The video/image capturing devices 102b include, but are not limited to, Closed-Circuit Television (CCTVs) cameras, High Definition (HD) cameras, non-HD cameras, handheld cameras, or any other video/image grabbing units. The video server 102a of the real-time streaming system 102 receives a dynamic imagery or video footage from the video/image capturing devices 102b, and transmits the associated data to the video analytics engine 106 in form of input frames. In an embodiment of the present invention, the video server 102a may process and refine the input frames prior to transmission. The refinement may be based on one or more pre-defined parameters, such as identifying and removing noise.

The video/image archive 104 is a data storage that is configured to store pre-recorded or archived videos/images. The video/image archive 104 may be composed of a plurality of local databases or remote databases. Also, the databases may be centralized and/or distributed. In an alternate scenario, the video/image archive 104 may store data using a cloud based scheme. Similar to the real-time streaming system 102, the video/image archive 104 transmits data in form of input frames to the video analytics engine 106. The real-time streaming system 102, the video/image archive 104, and the video analytics engine 106 are connected over a network 118. In an embodiment of the present invention, the real-time streaming system 102 may also send data (input frames) to the video/image archive 104 for storage and subsequent retrieval.

The network 118 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 118 may be any other type of network that is capable of transmitting or receiving data to/from host computers, personal devices, telephones, video/image capturing devices, video/image servers, or any other electronic devices. Further, the network 118 is capable of transmitting/sending data between the mentioned devices. Additionally, the network 118 may be a local, regional, or global communication network, for example, an enterprise telecommunication network, the Internet, a global mobile communication network, or any combination of similar networks. The network 118 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 118 may include any software, hardware, or computer applications that can provide a medium to exchange signals or data in any of the formats known in the art, related art, or developed later.

The video analytics engine 106 is part of at least one of a surveillance system, a security system, a retail system, a monitoring system, and a business intelligence-based system. The video analytics engine 106 receives the input frames from real-time streaming system 102 and/or the video/image archive 104. The video analytics engine 106 processes the input frames to first identify the background and the foreground, and then automatically detects, tracks, and classifies objects within the foreground portion of the input frames. In an embodiment of the present invention, one or more events may be generated by the video analytics engine 106. Examples of the one more events include, but are not limited to, an object entering or exiting a scene, intrusion, camera tampering, and the like. The one or more events may be remotely monitored using a plurality of user devices 120, and may be automatically sent as push messages or notifications to the user devices 120. In another embodiment, the user devices 120 may track the events using a pull mechanism, wherein the user devices 120 send a request message to the video analytics engine 106 to display the one or more events. Further, the video analytics engine 106 is connected with the user devices 120 over wired or wireless communication means. Examples of the user devices 120 include, but are not limited to, a smart phone, a mobile device/phone, a Personal Digital Assistant (PDA), a computer, a work station, a notebook, a mainframe computer, a laptop, a tablet, an internet appliance, and any equivalent device capable of processing, sending and receiving data.

Figure 2:
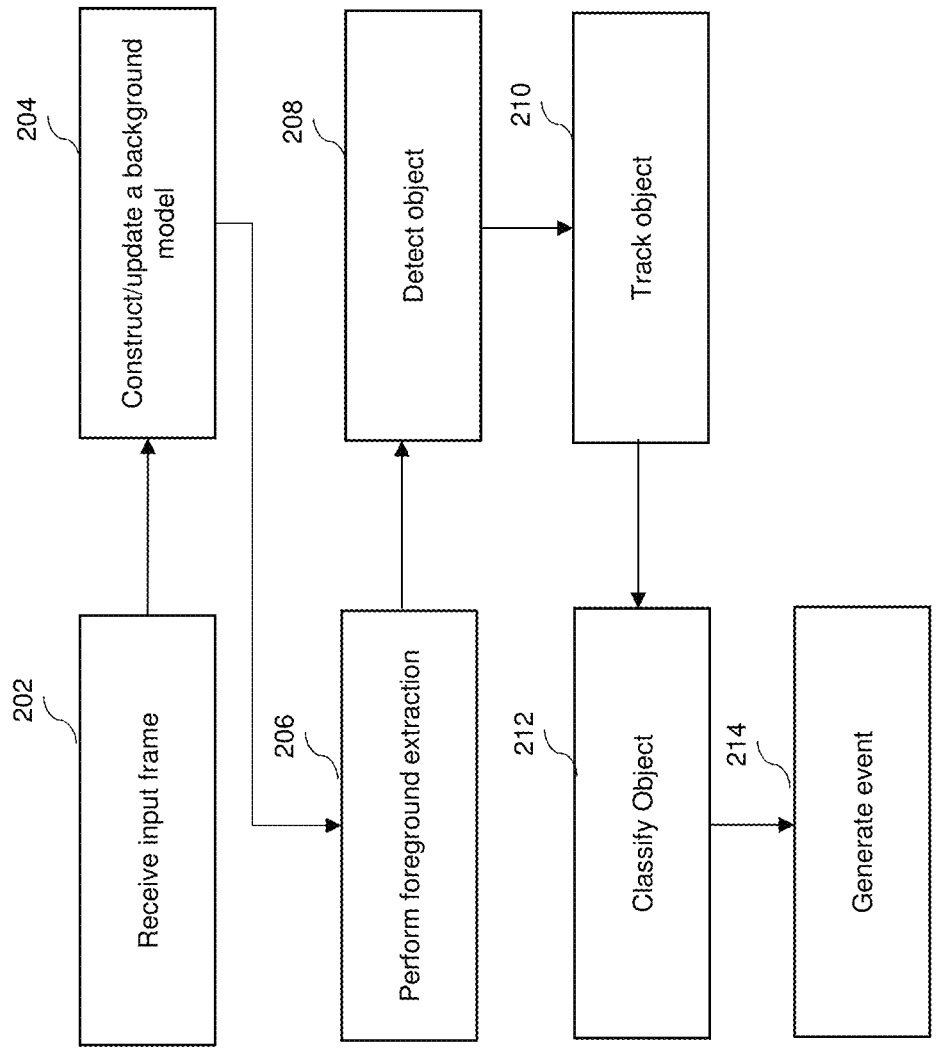
FIG. 2 shows the overall processing flow of a video analytics engine, according to an embodiment of the present invention.

The video analytics engine 106 includes a background modelling system 108, a foreground extraction system 110, an object tracking system 112, an event detection system 114, and a database 116. The specific details of these systems will be explained in conjunction with FIG. 2. It may be understood that in an embodiment of the present invention, the components 108-116 may be in the form of hardware components, while in another embodiment, the components 108-116 may be in the form of software entities/modules. In yet another embodiment of the present invention, the components may be a combination of hardware and software modules. Further, the video analytics engine 106 may be a part of at least one of the group comprising a mobile phone, a computer, a server, or a combination thereof Overall Processing Flow:

FIG. 2 shows the overall processing flow of the video analytics engine 106, according to an embodiment of the present invention. The processing flow starts at 202 with receipt of pre-recorded, or archived videos or images in form of input frames by the video analytics engine 106. In an embodiment, the video analytics engine 106 stores the input frames in the database 116 prior to initiating any processing. The receipt of input frames may be performed automatically, at pre-defined intervals, or when triggered (using pull mechanism) by the video analytics engine 106 or even by the user devices 120. At 204, a background model is constructed and updated, wherein the background model is used to detect static and moving objects in the input frames. The background model is constructed/updated by the background modelling system 108. The background model is then stored in the database 116. In an embodiment of the present invention, the background model is already constructed before receiving the input frames, while the updating process is executed in real-time. In another embodiment, the background model is constructed as well as updated in real-time. The details of the background model will now be discussed.

The background model is constructed by maintaining a plurality of color bins with their respective weights for each image pixel of the input frame, such that the weights represent the importance of the background bin's model. Each pixel can be represented as an array of bins:

$$B_k = \{C_k, W_k\}$$

where $C_k$ is the center color point and $W_k$ is a bin weight. In an exemplary embodiment, a higher weight indicates that the corresponding pixel was seen for a longer amount of time.

In another embodiment of the present invention, a bin-transitions-model (BTM) is computed and maintained for each pixel. This helps model the order in which pixel values usually change over long periods of time. As an example, for an outdoor scene, the lighting gradually changes from dawn to day, and then from dusk to night. This sequence of lighting change is analysed and learnt for the current bin, and the probabilities for lighting change for the next bins is estimated. In one exemplary embodiment, the BTM model is constructed as a discrete-time Markov chain, where the probability of next bins' computations depend only on the current bin.

The background model of the present invention is constantly updated over time. For example, the model is updated to handle gradual time variations (such as night/day changes), and a plurality of short-term changes (such as moving clouds/sun, shadows, etc.). In addition, the background model update also involves spatial changes (neighbour pixel changes) in order to be more robust to noise and some local changes within the input frames.

When the background model is applied to the input frame, a pixel is added into the background if there are no local color and edge changes around the pixel for some time period. Further, if the background pixel has not been observed over a long period of time, it is removed from the background model. In order to keep stationary objects in the foreground, one or more tracker information is used to block some regions from adding to the background model. Further, the input frames may correspond to complex scenes that include areas with significant background variations/continuous movements. Examples include, but are not limited to, trees, fountains, water, fans, and blinking lamps. For such cases, the scene is divided into two areas: a) areas with static background, b) areas with dynamic background. The division between these two areas is updated continuously depending on the input frames and maybe changed over time. In an embodiment, for each area, a different algorithms maybe applied for both background model update and foreground extraction.

At 206, a foreground extraction is performed by splitting the input frame pixels into two regions: a) background and b) foreground. The foreground extraction is done by the foreground extraction system 110 by executing an algorithm. According to this algorithm, for a current pixel of the input frame, the background bins with similar features as the current pixel are identified. For this process, a distance (in one example, measured as Euclidean) between the currently observed pixel and the background bin color is calculated. If this distance is less than a pre-defined threshold, then the currently observed pixel corresponds to the background bin color, and is classified as a background and the corresponding background bin (of the background model) is updated. Otherwise, the currently observed pixel is marked as foreground. In an embodiment of the present invention, Local Adaptive Thresholds (LAT) technique may be employed for the calculation. Using the LAT technique, the threshold for each pixel may be computed independently and the threshold may be adapted dynamically with time. The LATs may be calculated based on a plurality of factors, including, but are not limited to, local statistical measures, noise level, illumination, sensitivity parameter settings, and the like.

Further, the splitting of input frame pixels into background and foreground is implemented in form of a binary decision. However, for low-contrast objects (or object's parts) the colors are very close to background colors. A binary decision may result in significant object segmentation into foreground/background areas and the entire object can be lost. Therefore, in an embodiment, a confidence of fuzzy foreground mask is used. In this technique, the algorithm executed by the foreground extraction system 110 yields a fuzzy decision instead of binary decision, and provides a confidence value if the pixel is foreground (for example, in [0 . . . 100] range). The output of 206 is a binary mask indicating whether each pixel in the input frame is considered as a background or foreground. Further, the pixels marked as foreground or background are stored in the database 116.

Further, 208-212 are each executed by different components of the object tracking system 112. These components will be later discussed with respect to FIG. 3. At 208, the pixels that correspond to foreground are analyzed to detect objects from therein. While processing the pixels marked as foreground, first "blobs" are identified. There may be instances where the pixels contain noise, or contain other variations due to which the background vs. foreground categorization could not be done accurately by the foreground extraction system 110. For this process, a blob detection/merging algorithm is used to filter out the noisy pixels and small foreground areas. The blob algorithm finds the blobs on the binary mask (foreground mask), validates them and then either removes the noise cases or merges the pixels for low contrast cases. The validated and filtered areas are then labelled and called "blobs". In an embodiment of the present invention, the blob detection/merging algorithm additionally analyzes one or more data points while merging decisions. Examples of the one or more data points include, but are not limited to, a camera model, a camera perspective information, and the like. The data points may be stored in the database 116. In case the blob detection/merging algorithm identifies that the camera used was a 360 degree overhead model, it can understand the distance-on-ground corresponding to distance-in-pixel as a function of the pixel location, and hence make an intelligent decision whether or not to merge group of pixels into the same blob.

Next, at 210, the objects are tracked using one of the following techniques: 1) using the information contained in the current frame and one or more previous frames and performing an object correspondence, or 2) a feature/model based tracking. In the first technique, a bounding box estimation process is executed, wherein the bounding box (or any other shape containing the object) of an object in the current frame is compared with its bounding box in the previous frame(s) and a correspondence is established using a cost function. A pair of objects that include the minimum value in the cost function is selected by the object tracking system 112. In the second technique, the bounding box of each tracked object is predicted based on maximizing a metric in a local neighbourhood. This prediction is made using optical flow, mean shift, and/or dense-sampling search, and is based on features such as Histogram of Oriented Gradients (HoG) color, Haar-like features, and the like. The details of both the techniques will be discussed with respect to FIG. 3 and FIG. 4.

At the end of 210, the objects have been tracked in the current frame, and at 212, each of the objects are classified and stored in the database 116. Each object is assigned at least one class/category. Examples of classes include, but are not limited to, person, vehicle (such as a car, a bicycle, etc.), animals (such as dogs, cats, etc.), and the like. The classification algorithm may be based on supervised machine learning techniques such as -SVM, Decision Tree, Neural Net, Ada Boost, and the like. Further, the classification is performed by analyzing one or more features of the tracked objects, such as size, aspect ratio, location in the scene, and other generic features such as color, HoG, Scale-Invariant Feature Transform (SIFT), Haar, Local Binary Patterns (LBP), and the like. In another embodiment of the present invention, the classification algorithm employs unsupervised machine learning to learn the features from the image data itself. For example, a Neural Network Autoencoder can be used to learn the features and then to train a Deep Neural Network or a Convolutional Neural Network.

Finally, at 214, the objects tracked at 210 are analysed to identify one or more events. This analysis is performed by the events detection system 114. In case of security or surveillance systems, the one or more events correspond to at least one of the two types: a) object related events, and b) system events. Examples of the object related events include, but are not limited to, object enter/exit, line crossing, intrusion detection, dwell/loitering detection, fall/duress detection, and the like. Further, the system events include, but are not limited to, a camera tamper, lights on/off, a camera defocused, and the like. Further, the object classification information collected at 212 is also taken into account for generating the one or more events. Typically, the rules corresponding to generation of the one or more events are pre-defined in the video analytics engine 106. The rules include filtering objects based on their classes and then producing alarms for only specific object types. This way the instances of false alarms are reduced, and the results are resistant to image noise, illumination changes and complex outdoor environments (such as trees, water, clouds and etc.). When one or more events are identified, a corresponding alarm or notification is sent to the user devices 120. The alarm or notification may be in a plurality of formats. Examples include, but are not limited to, a text message, an online message, an e-mail, a telephone call, an audio/visual cue displayed on the device, and the like. In an embodiment, one or more pre-defined actions may also be automatically triggered on detection of events, such as an automatic locking of a door at the premise being monitored, playing a siren at the premise, and the like.

Figure 3:
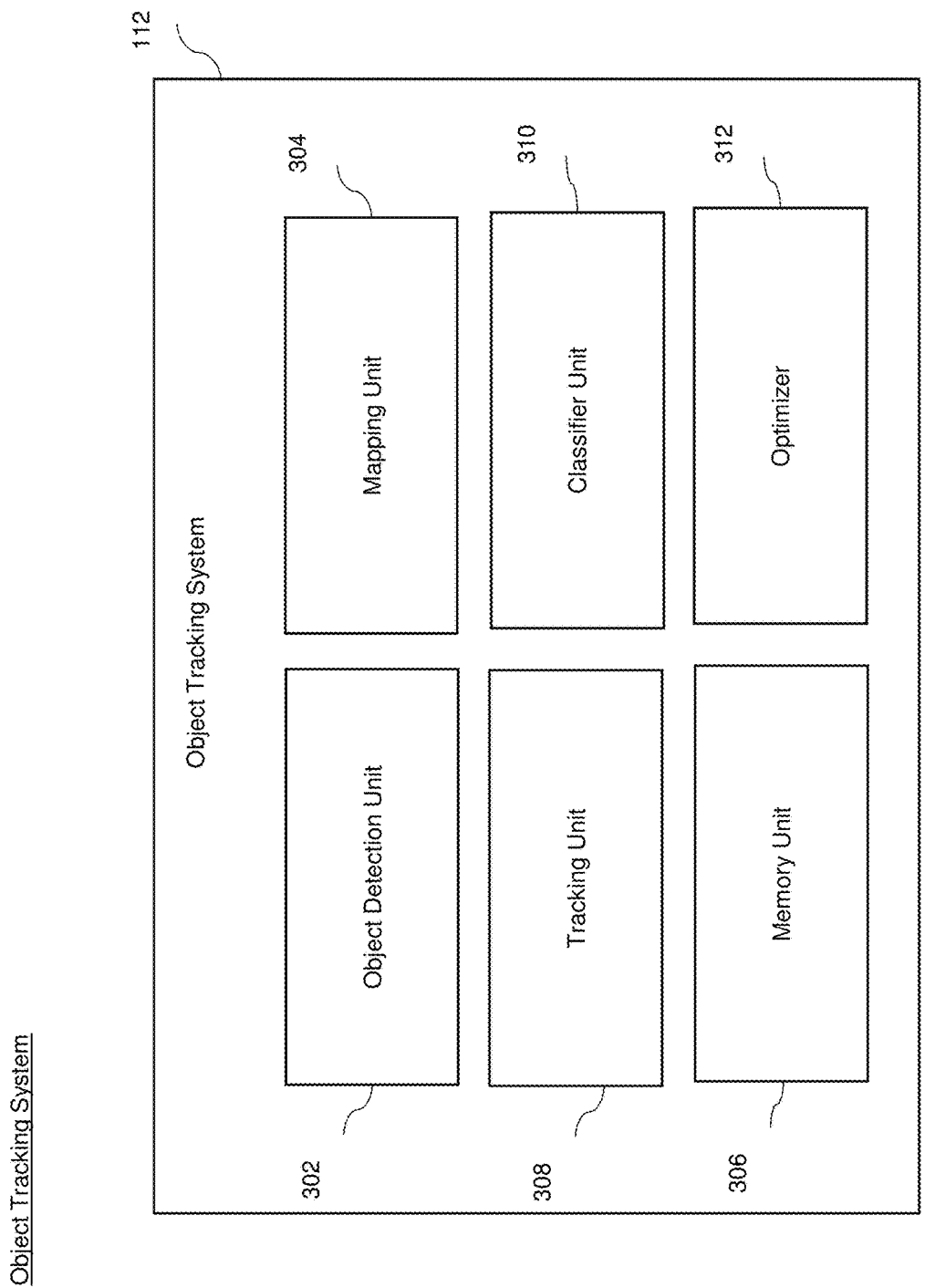
FIG. 3 illustrates various components of an object tracking system.

FIG. 3 illustrates various components of the object tracking system 112. The object tracking system 112 includes an object detection unit 302, a mapping unit 304, a tracking unit 308, a classifier unit 310, a memory unit 306, and an optimizer 312. Together these components detect, track, and classify one or more objects in a plurality of input frames. The object detection unit 302 is configured to detect the one or more objects in the plurality of input frames, while the mapping unit 304 is configured to compute a cost matrix for each of the one or more objects across the plurality of input frames. Using the cost matrix, the tracking unit 308 is configured to track the one or more detected objects, and the classifier 310 is configured to classify each of the detected/tracked objects based on their features. The detected, tracked, and/or classified one of more objects are stored in the mapping unit 306. In addition, the optimizer 312 is configured to reduce the size of the cost matrix. The details of each of the components will be discussed in conjunction with the method flowchart of FIG. 4.

Object Detection and Tracking Flowchart:

As discussed with respect to FIG. 2, the foreground extraction system 110 splits the input frame pixels into background and foreground, and provides the foreground-marked pixels to the object tracking system 112. In particular, the foreground-marked pixels are received by the object detection unit 302 of the object tracking system 112. In an embodiment of the present invention, the foreground marked pixels may be saved in the database 116 by the foreground extraction system 110, and are accessed by the object detection unit 302 at a later point in time. In another embodiment, the foreground-marked pixels are sent dynamically (as and when identified) to the object detection unit 302. The detection and tracking process will be explained with respect to FIG. 4.

Figure 4:
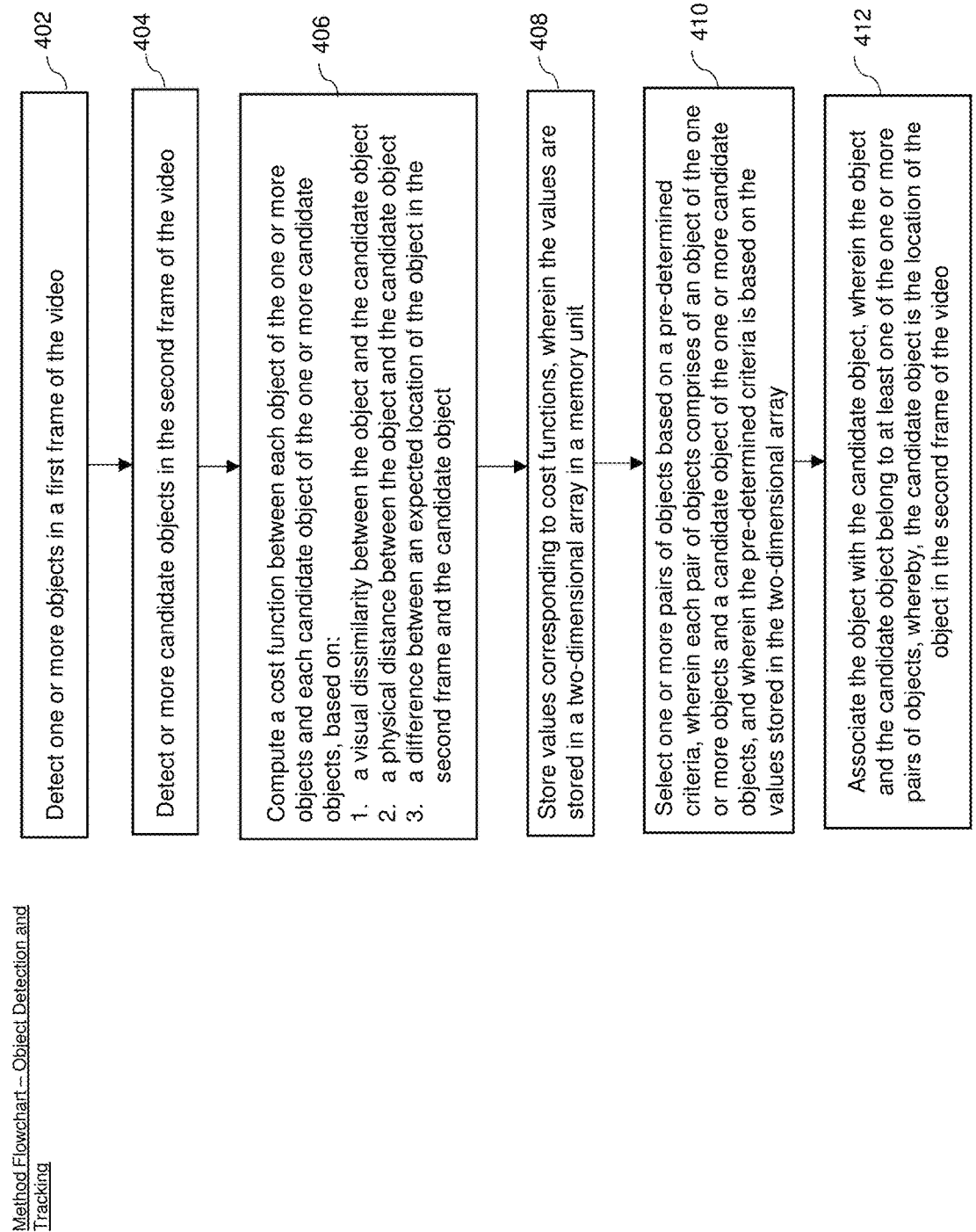
FIG. 4 is a method flowchart for detecting and tracking objects using a cost matrix.
Figure 5:
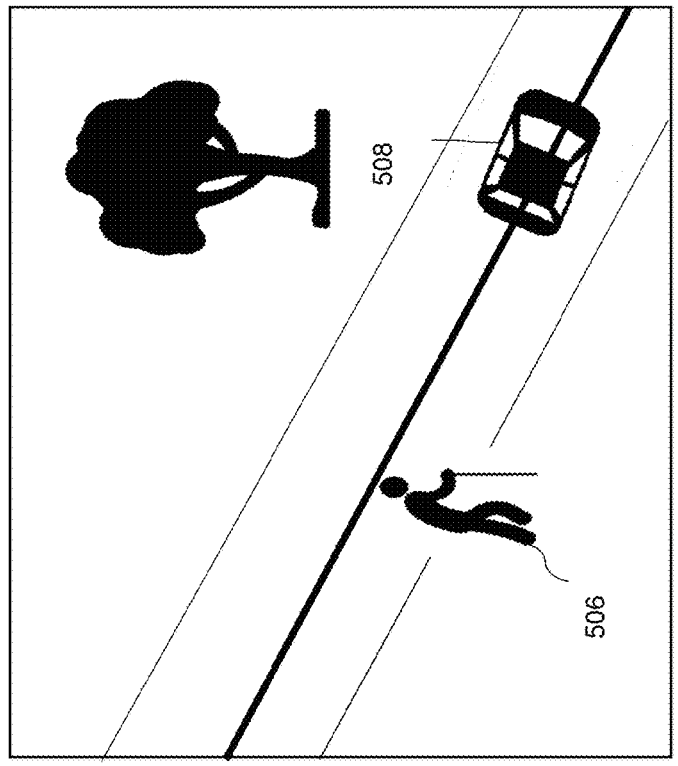
FIG. 5 illustrates an exemplary input frames of a video.
Figure 5:
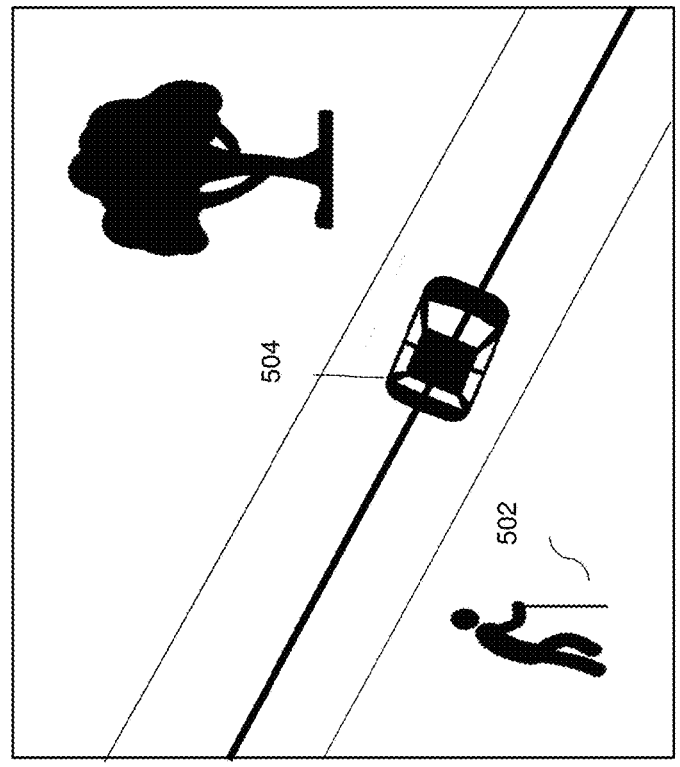

FIG. 4 is a method flowchart for detecting and tracking objects using a cost matrix. The object detection unit 302 (of the object tracking system 112) is configured to accept at least two input frames of a video: a first frame and a second frame. The first frame includes one or more objects. The second frame is a frame subsequent to the first frame and includes one or more candidate objects. Further, the second frame may not necessarily be a frame right next to the first frame. In other words, the second frame may be a frame that appears in any sequence post the appearance of the first frame. Essentially, the second frame is the current frame being analyzed, and the first frame is one of the previous frames. The method flowchart begins at 402 with the object detection unit 302 detecting the one or more objects in the first frame. At 404, the object detection unit 302 detects the one or more candidate objects in the second frame Exemplary input frames are shown in FIG. 5, where the one of more objects of the first frame include a first person object 502 and a first car object 504. Similarly, the one or more candidate objects of the second frame include a second person object 506 and a second car object 508.

At 402 and 404, the object detection process is estimated using a bounding box (or any other shape containing the object) of the one or more candidate objects in the second (current) frame, given its bounding box in the first (previous) frame. At a later stage (at 410), the tracking unit 308 performs a correspondence between the one or more objects of the first frame, and the one or more corresponding objects of the second frame.

In an embodiment of the present invention, during the object detection process, the object detection unit 302 executes a blob detection/merging algorithm to find blobs on the first frame and second frame, and filter out the noisy pixels and small foreground areas. In addition, the blob detection/merging algorithm takes into account one or more data points while execution. The one or more data points may include, but are not limited to, a camera model, a camera perspective information, and the like. In an embodiment of the present invention, the one or more data points are accessed by the object detection unit 302 from the database 116. In another embodiment, the one or more data points are saved in the memory unit 306 of the object tracking system 112.

At 406, the mapping unit 304 is configured to compute a cost matrix between each object of the one or more objects (first frame) and each candidate object of the one or more candidate objects (second frame). If the first frame is t and the second frame is t+1, the objects at t are of order O1 and the candidate objects at t+1 are of order O2. The cost matrix is computed as:

$$\text{Cost}(O1,O2) = w\_visual * cost\_visual(O1,O2) + w\_distance * cost\_distance(O1,O2) + w\_expectedLoc * cost\_expectedLoc$$

In the above equation:

Cost (O1, O2) indicates a measure of cost between pair of objects O1 and candidate objects O2.

cost_visual is a cost measure encapsulating the visual dissimilarity between the objects and the candidate objects. The visual dissimilarity is determined based on at least one of a color based similarity, a gradient based similarity and a texture based similarity. Further, the visual dissimilarity can be represented in form of a color histogram distance, HOG-based distance, and the like.

cost_distance is a cost measure encapsulating the physical distance between the objects and the candidate objects. The physical distance is determined based on number of pixels between the object and the candidate object. Further, the physical distance corresponds to a perspective geometry information. In an embodiment, it may also be represented as a Euclidean distance.

cost_expected Loc is a cost measure encapsulating the error in expected location of object O1 and the actual location of candidate object O2. The difference between an expected location of the object in the second frame and the candidate object is determined based on at least one of a location of the object in the first frame, a speed of the object, and a direction of motion of the object. For example, in FIG. 5, the speed and direction of motion of the first car object 504 is estimated to identify its location in the second frame.

w_visual, w_distance, w_expectedLoc are the three weights assigned to the individual cost measures to represent their relative importance. Further, the sum of the three weights should be 1. The weights may be either fixed for a given application or may be dynamically adjusted.

At 408, the values corresponding to the cost function/matrix are stored in the memory unit 306. In an embodiment of the present invention, the values are stored in form of a two-dimensional (2D) array. In another embodiment, a different schema may be used to store the values. In yet another embodiment, the values may be stored external to the object tracking system 112, for example, in the database 116.

Next, at 410, an object tracking is performed by the tracking unit 308. The tracking unit 308 is configured to track the one or more candidate objects using one of the following techniques: 1) using the bounding box estimation data of the second (current) frame and the first (previous) frame and formulating a correspondence based on a cost matrix, wherein the bounding box data is computed by the object detection system 302) a feature/model based tracking.

Technique 1: Cost Computation Based Correspondence

For the first technique, the tracking unit 308 selects one or more pairs of objects based on a pre-determined criteria, wherein each pair of objects includes: a) an object of the one or more objects (first frame) and b) a candidate object of the one or more candidate objects (second frame). Further, the pre-determined criteria is based on the values stored in the memory unit 306 as the two-dimensional array. Essentially, the pre-determined criteria is to select the pair of objects whose value corresponding to the cost function is less than the values corresponding to cost functions computed between the object and each of the remaining candidate objects. In addition, the tracking unit 308 applies a Hungarian method to select the one or more pairs of objects in the most optimized fashion according to the pre-determined criteria. In an embodiment of the present invention, other techniques may be used in place of the Hungarian method.

At 412, the tracking unit 308 associates the object with the candidate object, wherein the object and the candidate object belong to a pair of the one or more selected pairs of objects. Moreover, the candidate object is the location of the object in the second frame. For example in FIG. 5, the pair of objects may be the first car object 504 (the object of first frame) and the second car object 508 (the candidate object of the second frame).

The selection of the one or more pairs of objects by the tracking unit 308 is based on the cost function previously computed for each object, which is stored as values of Cost (O1, O2) in a cost matrix of the mapping unit 304. The Cost (O1, O2) is computed based on a function of a visual dissimilarity, a physical location, and an expected location. For each object O1 of the first frame, the candidate object O2 of second frame with minimum Cost (O1, O2) is selected and assigned. The candidate object thus associated is the location of the object in the second frame of the video. For example, in FIG. 5, the second car object 508 is the candidate object assigned to the first car object 504 of the first frame.

Figure 6:
FIG. 6 illustrates an exemplary two-dimensional layout of a cost matrix.

In an embodiment of the present invention, there may be overlapping assignments between the selected object in the first frame, and the selected candidate in the second frame. For such cases, the size of the cost matrix is first reduced/optimized by the optimizer 312 of the object tracking system 112. Accordingly, the tracking unit 308 accesses the reduced cost matrix to execute object assignment (using the Hungarian method). This makes the assignment more optimal. In FIG. 6, an exemplary layout of a cost matrix 602 is indicated. The cost matrix 602 is in form of a two-dimensional matrix with a plurality of rows and columns. The rows and columns correspond to the one of more objects of the first frame, and the one or more candidate objects of the second frame respectively. The cost value calculated for each object is stored in the cost matrix 602. As an example, the values shown in FIG. 6 are V_10, V_5, and the like, wherein the numerals 10 and 5 indicate cost values. V_10 indicates that the cost value for an object in the first frame and a candidate object in the second frame is higher than the objects with value V_5. It should be understood to a person skilled in the art, that the above representation is only exemplary. Multiple formats and varied units may be used to indicate the cost values.

To reduce the size of the cost matrix 602, the optimizer 312 performs the following steps:

1) In each column C of the cost matrix 602, the values are checked to identify if there is a value which is most significantly smaller than others. If yes, the corresponding row index of the value is identified as R. For example, in FIG. 6, in Column C1, the value that is significantly smaller than others is V_1. Its corresponding row index is identified as R2.

2) In the row R, the values are compared to the values of all other elements/objects. If the value is significantly less than all other elements, the element is marked as (R, C) in the cost matrix 602. In FIG. 6, the value of V_1 in (R2, C1) is compared with all values in row R2, and it continues to be the least of all values.

3) The above process is repeated for all columns in the cost matrix 602.

4) Considering all the marked elements in the cost matrix 602, the cases that have at least one more marked element in its row or column are rejected.

5) The rows and columns of the cost matrix 602 to which these remaining marked elements belong, are removed.

After executing the above steps, the cost matrix 602 will be typically of much reduced size, as the object-pairs (rows and columns) which had a high probability to be the correct matching pair have been eliminated. Subsequently, the tracking unit 308 uses the Hungarian method to make the object selection and assignment.

Technique 2: Feature/Model Based Tracking:

The tracking unit 308 employs a second technique when there is no reliable correspondence between the one or more objects (of the first frame) and the one or more candidate objects (of the second frame). For example, when there is only one candidate object, however there are multiple one or more objects tracked around it in the first frame. For such cases a feature/model based tracking is used. For this second technique, the bounding box of each previously tracked object is predicted based on maximizing a metric in a local neighborhood. This prediction is made using optical flow, mean shift, dense-sampling search based on some features such as HoG, color, Haar-like features, and the like. In an embodiment of the present invention, for each object, a neighborhood region is formed and the number of one or more candidate objects and the number of one or more tracked objects in that region are checked. If the number of one or more tracked objects is different than the number of one or more candidate objects, then the objects are tracked based on local neighborhood search using feature based similarity.

In an embodiment of the present invention, once the tracking unit 308 has tracked the objects, the classifier unit 310 is configured to classify each of the objects in at least one category, and stores the information in the memory unit 306. In another embodiment, the classified objects are stored in the database 116. The classification algorithm may be based on a supervised or an unsupervised machine learning technique, and the classification is performed by analyzing one or more features of the tracked objects. Examples of the one or more features include, but are not limited to, a size, an aspect ratio, a location in the scene, and other generic features such as color, HoG, SIFT, Haar, LBP, and the like. Typically, the object classification algorithm is executed on top of object tracking algorithm and it allows to localize search region, thus decreasing the amount of computation. Such approach results in reducing power consumption and/or increase the detection speed and accuracy.

Figure 7:
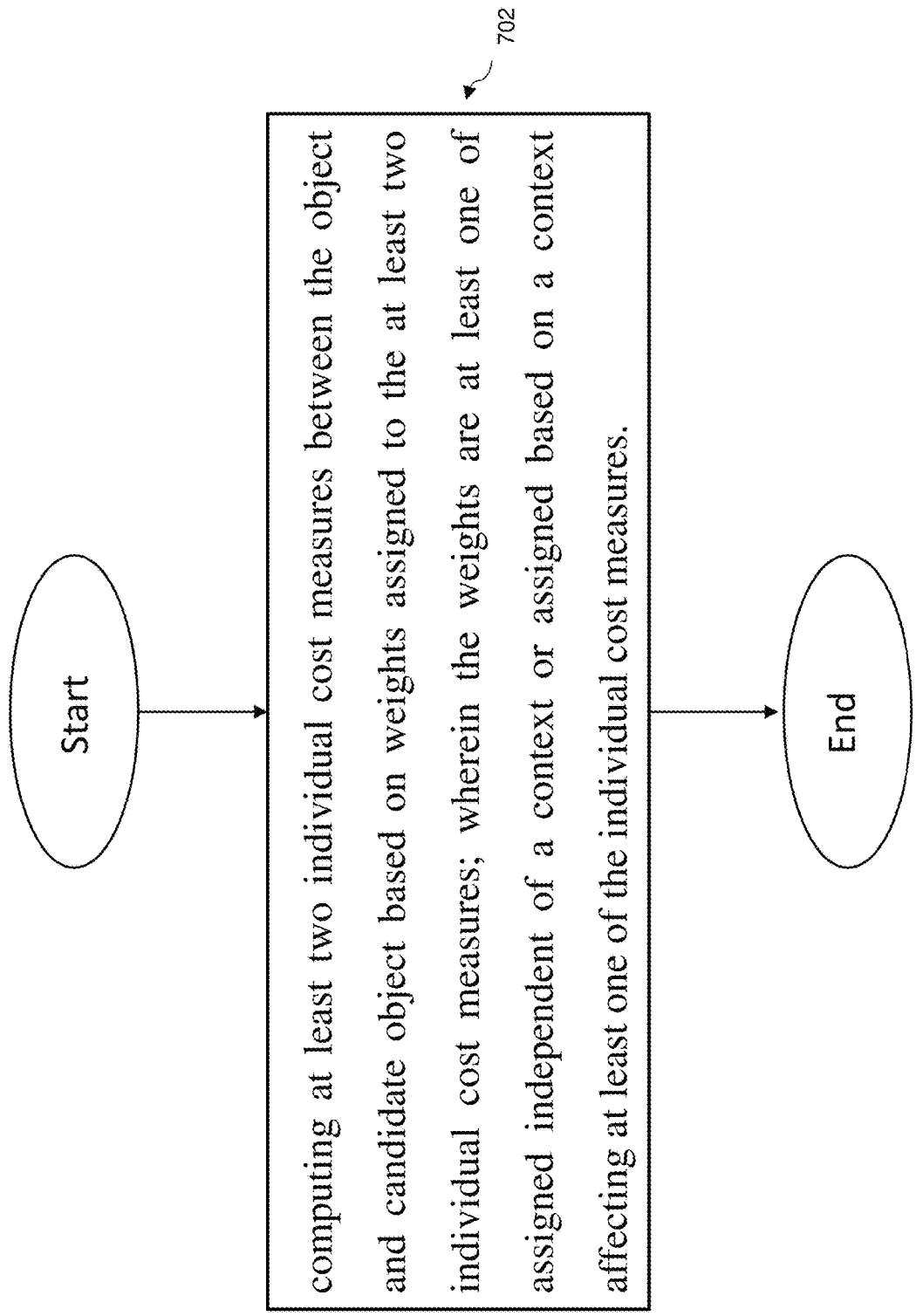
FIG. 7 illustrates an exemplary method flow of a context-aware function for assigning objects across frames.

Now in reference to FIG. 7, which is an exemplary method flow diagram comprising the step for assigning objects across frames based on a cost function. The at least one frame may be derived from at least one of a live video, an archived video stored in a data storage, or a recorded video. Furthermore, the any one of the video may be captured from at least one of a surveillance system, a security system, a retail system, a monitoring system, or a business intelligence-based system.

In a preferred embodiment, a method for assigning objects (tracked objects) in one frame to candidate objects (detected objects) in another frame based on weights assigned to individual cost measures, comprise the step of: computing at least two individual cost measures between the object and candidate object based on weights assigned to the at least two individual cost measures; and wherein the weights are at least one of assigned independent of a context or assigned based on a context affecting at least one of the individual cost measures 702.

The individual cost measures may be at least one of a visual similarity or dissimilarity, distance or proximity, or expected location between objects across frames for the purpose of calculating a cost function between the objects across the frames. Objects may be either one of a object/tracked object (e.g., o1) from at least a first frame or candidate/detected object (e.g., o2) from another frame.

$$\text{Cost}(o1,o2) = w\_visual * cost\_visual(o1,o2) + w\_distance * cost\_distance(o1,o2) + w\_expectedLoc * cost\_expectedLoc$$

The cost_visual can be any cost measure encapsulating the visual dissimilarity between the objects. For example, it could be color histogram distance, HOG-based distance, etc. The cost_distance can be the cost measure encapsulating the pixel location distance between the objects. For example, the Euclidean distance. The cost expected Loc can be the cost measure encapsulating the error in expected location of object o1 (based on its speed and prior location) and the actual location of object o2. Other individual cost measures may be available for computing a cost function between object pairs, such as velocity, motion, proximity, etc.

The weights w_visual, w_distance, w_expectedLoc are the weights assigned to the individual cost measures to represent their relative importance, and their sum can be 1. These weights can be either fixed for a given application or dynamically adjusted depending upon the circumstances or context. Costs can thus be computed for each pair of objects and the information contained in a cost matrix. The assignment problem for each object o1 can be solved by simply choosing the object o2 for which the cost Cost(o1,o2) is minimum.

In one embodiment, the cost function is computed based on fixed weights or pre-determined weights assigned to any one of the individual cost measures. However, in other embodiments, the cost-function shown above can be adjusted dynamically depending upon the context. In one embodiment, the weight of the visual cost measure is assigned a higher weight compared to at least one other individual cost measure in the context of crowded objects in at least one frame. The weight w_visual can be assigned a higher weight compared to w_distance and w_expectedLoc when objects in the scene are expected to come together such as in a crowded scene with people. In such cases, computing cost function based on visual appearance makes more sense than those based on distance or trajectory. Similarly, the weight of the distance cost measure may be assigned a higher weight compared to at least one other individual cost measure in the context of sparse objects in at least one frame. For example, in people tracking cases, when people are far away from each other, w_distance can be assigned higher weight because even if the same person appears visually different from one frame to another (due to lighting or camera characteristics), it is highly likely it is the same person due to sparsity (low density) of people.

It is to be appreciated by a person of ordinary skill in the art that the density or sparsity of objects may not be limited to just humans or vehicles, but encompasses any one of a living being or objects associated with any one the living beings—without departing from the scope of the claimed invention. This dynamic approach not only leads to more efficient reduction of the cost matrix, but also more accurate tracking results can be obtained.

In the event there are overlaps in assignment, the overlapping assignments can be maintained until the unique assignments can be obtained at a future point in time. For optimal solution to the assignment problem, a Hungarian method using the cost matrix computed above may be employed. However, the Hungarian method can be computationally intensive as the number of objects grows. By adopting a two-pronged approach of: (1) reducing the size of the assignment problem, and then (2) applying the Hungarian method on this smaller problem. This leads to a very efficient approach computationally while still being optimal most of the time. The approach is as follows—

In a column c of the cost matrix, check if one and only one value is significantly smaller than others. If yes, let the row index of that element be r.

Now in that row r, compare its value to all other elements. If the value is significantly less than all other elements, mark the element (r,c) in the matrix.

Repeat the above for all columns in the cost matrix

Considering all the marked elements in the cost matrix, reject all those that have at least one more marked element in its row or column.

Remove the rows and columns of the cost matrix to which these remaining marked elements belong.

In another embodiment, a delayed reduction of the cost-matrix approach may be employed for further reduction of the cost matrix. The cost function calculation or computing any one of the individual cost measures may be delayed until a significant reduction can be obtained after ambiguities are resolved. For example, in people tracking scenarios, when multiple people come together in a group, the cost-matrix reduction step may be postponed until one or more objects leaves the group. In the intervening time, the IDs of the previously tracked objects may be left unchanged in an ambiguous state or multiple candidate IDs may be assigned once the state is changed.

While not included in FIG. 7, in cases when the problem cannot be formulated reliably as a correspondence problem (for example, when only one candidate object is detected and multiple tracked objects around it), one can resort to feature/model-based tracking. In an embodiment, after predicting a bounding box of each tracked object based on maximizing a metric in a local neighborhood, using optical flow, mean shift, or dense-sampling search based on some features such as HoG, color, Haar-like features etc. For each object, a neighborhood region is formed and the number of tracked objects and the number of detected objects in that region are checked. If the number of detected objects is less than the number of tracked objects, then any one of the additional tracked objects or missing detected objects are further tracked based on a local neighbourhood search using feature-based similarity.

Similarity of features may be based on at least one of a size, aspect ratio, location, color, Histogram of Oriented Gradient (HOG), Scale-invariant feature transform (SIFT), HAAR like features and Local Binary Pattern (LBP) of the object. In some embodiments, tracking, assigning, or detecting of objects may be based on at least one of an object detection-based tracking (cost function approach described above) or the feature/model-based tracking (described here). In other embodiments, the method of tracking, assigning, or detecting objects across frames may alternate between tracking approaches intelligently or dynamically based on a context, computational resources, or efficiency requirements, etc.

While also not illustrated in FIG. 7, other approaches to solve the problem of a assigning object(s) obtained in the previous frame with the detection(s) on the current frame may be implemented. There can be single object (SO) or multiple objects (MO) in the previous frame, and similarly there can be single detection (SD) or multiple detections (MD) in the current frame. The following 4 scenarios cover all possible combinations:

1) SD-to-SO match,
2) SD-to-MO matches,
3) MD-to-SO matches,
4) MD-to-MO matches.

In one embodiment, a method for assigning objects across frames comprises the steps of: generating a list of at least one candidate object with a threshold-grade overlap with a predicted position of the object from a previous frame; and applying visual similarity or dissimilarity between the candidate object and object pair and rejecting the pair below a threshold-grade similarity or above a threshold-grade dissimilarity. In the event that more than one non-rejected candidates are obtained, a list of all possible assignments are maintained until later when the ambiguity is resolved. After the predictions are made, the matching algorithm tries to associate detections with the shifted-position objects.

The SD-to-MO and MD-to-SO cases are considered as a "merge" or "split" case. For these scenarios the tracker continues to maintain all possible (multiple) assignments until later, when the ambiguity is resolved. For example, the objects that had come together (merged) have now moved away from each other and can be detected separately. These can then be solved using the MD-to-MO approach mentioned below.

For the MD-to-MO cases, the matching algorithm is designed in the following way: for each object on the previous frame the new object position on the current frame is calculated. Depending on the hardware it's accomplished by velocity vector, cam/median shift, optical flow or CNN-based predictions. Either a single estimator or their combination can be used for more robust results. Given the predicted position, a candidate short-list of detected objects which have sufficient overlap with the predicted position are generated. From there, compute visual similarities and reject all candidates which have a visual similarity below a threshold. Alternatively, accept only candidates with a visual similarity above a threshold. In yet other alternative embodiments, one can factor a threshold-grade dissimilarity for accepting or rejecting. If more than one such candidates are obtained, the list of all possible assignments are maintained, until later when the ambiguity is automatically resolved.

The object tracking system 112, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks such as the s that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

Embodiments described in the present disclosure can be implemented by any system having a processor and a non-transitory storage element coupled to the processor, with encoded instructions stored in the non-transitory storage element. The encoded instructions when implemented by the processor configure the system to track objects as discussed above in FIGS. 1-6. The system shown in FIGS. 1 and 3 can practice all or part of the recited methods (FIGS. 2 and 4), can be a part of the recited systems, and/or can operate according to instructions in the non-transitory storage element. The non-transitory storage element can be accessed by a general purpose or special purpose computer, including the functional design of any special purpose processor. Few examples of such non-transitory storage element can include RAM, ROM, EEPROM, CD-ROM or other optical disk storage or other magnetic. The processor and non-transitory storage element (or memory) are known in the art, thus, any additional functional or structural details are not required for the purpose of the current disclosure.

For a person skilled in the art, it is understood that these are exemplary case scenarios and exemplary snapshots discussed for understanding purposes, however, many variations to these can be implemented in order to detect and track objects in video/image frames.

In the drawings and specification, there have been disclosed exemplary embodiments of the present invention. Although specific terms are employed, they are used in a generic and descriptive sense only and not for purposes of limitation, the scope of the present invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the present invention.

We claim:

1. A method for assigning objects in one frame to candidate objects in another frame, said method comprising the steps of:
    assigning a weight of a visual cost function higher than a weight of a distance and/or expected location function for at least an object in one frame and a candidate object in a different frame based on a density of objects in any one of the frames;
    computing a cost measure between the object and candidate object based on weights assigned to the at least two cost measures; and
    execute object assignment based on the computed cost value.

2. The method of claim 1, wherein the cost measure is at least one of a visual similarity or dissimilarity between the object and the candidate object is determined based on at least one of a color based similarity, gradient based similarity and texture based similarity.

3. The method of claim 1, wherein the cost measure is a physical distance between the object and the candidate object and is determined based on number of pixels between the object and the candidate object, and wherein perspective geometry information is available.

4. The method of claim 1, wherein the cost measure is an expected location of the object in the second frame and is determined based on at least one of location of the object in the first frame, speed of the object and direction of motion of the object.

5. The method of claim 1, further comprising the step of applying a Hungarian method to select the one or more pairs of objects.

6. The method of claim 1, further comprising the step of optimizing a size of a two-dimensional array (cost matrix) of cost functions between a pair of objects.

7. The method of claim 1, further comprising classifying any one of the objects in one or more categories.

8. The method of claim 7, wherein the classifying is based on at least one feature of the object, and wherein the feature is at least one of a size, aspect ratio, location, color, Histogram of Oriented Gradient (HOG), Scale-invariant feature transform (SIFT), HAAR like features and Local Binary Pattern (LBP) of the object.

9. The method of claim 2, wherein the weight of the visual cost measure is assigned a higher weight compared to at least one other individual cost measure in the context of crowded objects in at least one frame.

10. The method of claim 3, wherein the weight of the distance cost measure is assigned a higher weight compared to at least one other individual cost measure in the context of sparse objects in at least one frame.

\* \* \* \* \*